US009065791B2

(12) United States Patent
Bosworth et al.

(10) Patent No.: US 9,065,791 B2
(45) Date of Patent: *Jun. 23, 2015

(54) GENERATING A CONSOLIDATED SOCIAL STORY IN A FEED OF STORIES FOR A USER OF A SOCIAL NETWORKING SYSTEM

(71) Applicant: Facebook, Inc., Menlo Park, CA (US)

(72) Inventors: Andrew G. Bosworth, Palo Alto, CA (US); Chris Cox, Palo Alto, CA (US); Ruchi Sanghvi, Palo Alto, CA (US); Thyagarajapuram S. Ramakrishnan, Saratoga, CA (US); Adam D'Angelo, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/962,897

(22) Filed: Aug. 8, 2013

(65) Prior Publication Data

US 2013/0325968 A1 Dec. 5, 2013

Related U.S. Application Data

(63) Continuation of application No. 12/902,024, filed on Oct. 11, 2010, now Pat. No. 8,521,787, which is a continuation of application No. 11/502,757, filed on Aug. 11, 2006, now Pat. No. 7,827,208.

(51) Int. Cl.
*G06F 7/00* (2006.01)
*H04L 12/58* (2006.01)
(Continued)

(52) U.S. Cl.
CPC ............ *H04L 51/16* (2013.01); *G06F 17/3089* (2013.01); *H04L 67/22* (2013.01); *H04L 67/306* (2013.01)

(58) Field of Classification Search
CPC ................... G06F 17/30648; G06F 17/30038; G06F 17/30268; G06F 17/30752; G06F 17/3082
USPC ................... 707/802, 795, 812, 712, 999.102
See application file for complete search history.

(56) References Cited

U.S. PATENT DOCUMENTS 5,937,413 A   8/1999  Hyun et al.
6,029,141 A   2/2000  Bezos et al.
(Continued)

FOREIGN PATENT DOCUMENTS

JP   2002-245212 A   8/2002
JP   2002-312559      10/2002
(Continued)

OTHER PUBLICATIONS

State Intellectual Property Office of the People's Republic of China, Third Office Action, Chinese Patent Application No. 200780034021. 3, Jan. 13, 2014, eight pages.
(Continued)

*Primary Examiner* — Mohammed R Uddin
(74) *Attorney, Agent, or Firm* — Fenwick & West LLP

(57) ABSTRACT

To generate dynamic relationship-based content personalized for members of a social networking system, at least one action of one or more members of the social networking system is associated with relationship data for the one or more members to produce consolidated data. One or more elements associated with the consolidated data is identified and used to aggregate the consolidated data. Further exemplary methods comprise weighting by affinity the aggregated consolidated data to generate dynamic relationship-based content personalized for the members of the web-based social network.

20 Claims, 5 Drawing Sheets

(51) Int. Cl.
*G06F 17/30* (2006.01)
*H04L 29/08* (2006.01)

(56) References Cited

U.S. PATENT DOCUMENTS

| | | | |
|---|---|---|---|
| 6,029,195 A | 2/2000 | Herz | |
| 6,513,069 B1 | 1/2003 | Abato et al. | |
| 6,816,850 B2 | 11/2004 | Culliss | |
| 7,013,292 B1 | 3/2006 | Hsu et al. | |
| 7,249,123 B2 | 7/2007 | Elder et al. | |
| 7,269,590 B2 | 9/2007 | Hull et al. | |
| 7,496,603 B2 | 2/2009 | Deguchi et al. | |
| 7,571,121 B2 | 8/2009 | Bezos et al. | |
| 7,599,935 B2 | 10/2009 | La Rotonda et al. | |
| 7,792,815 B2 | 9/2010 | Aravamudan et al. | |
| 7,809,709 B1 | 10/2010 | Harrison, Jr. | |
| 7,810,037 B1 | 10/2010 | Edwards et al. | |
| 7,890,709 B2 | 2/2011 | Yoo et al. | |
| 7,890,871 B2* | 2/2011 | Etkin | 715/738 |
| 2001/0037721 A1 | 11/2001 | Hasegawa et al. | |
| 2002/0059201 A1 | 5/2002 | Work | |
| 2003/0145093 A1 | 7/2003 | Oren et al. | |
| 2003/0222918 A1 | 12/2003 | Coulthard | |
| 2003/0225632 A1 | 12/2003 | Tong et al. | |
| 2004/0024846 A1 | 2/2004 | Randall et al. | |
| 2004/0088177 A1 | 5/2004 | Travis et al. | |
| 2004/0148275 A1 | 7/2004 | Achlioptas | |
| 2004/0172405 A1* | 9/2004 | Farran | 707/100 |
| 2005/0021750 A1 | 1/2005 | Abrams | |
| 2005/0114759 A1 | 5/2005 | Williams et al. | |
| 2005/0154639 A1 | 7/2005 | Zetmeir | |
| 2005/0159970 A1 | 7/2005 | Buyukkokten et al. | |
| 2005/0171799 A1 | 8/2005 | Hull et al. | |
| 2005/0171955 A1* | 8/2005 | Hull et al. | 707/10 |
| 2005/0197846 A1 | 9/2005 | Pezaris et al. | |
| 2005/0198020 A1 | 9/2005 | Garland et al. | |
| 2005/0198031 A1 | 9/2005 | Pezaris et al. | |
| 2005/0198305 A1 | 9/2005 | Pezaris et al. | |
| 2005/0216300 A1 | 9/2005 | Appelman et al. | |
| 2005/0216550 A1 | 9/2005 | Paseman et al. | |
| 2005/0235062 A1 | 10/2005 | Lunt et al. | |
| 2005/0256756 A1 | 11/2005 | Lam et al. | |
| 2006/0026147 A1 | 2/2006 | Cone et al. | |
| 2006/0041543 A1 | 2/2006 | Achlioptas | |
| 2006/0042483 A1 | 3/2006 | Work et al. | |
| 2006/0048059 A1 | 3/2006 | Etkin | |
| 2006/0052091 A1 | 3/2006 | Onyon et al. | |
| 2006/0080613 A1 | 4/2006 | Savant | |
| 2006/0085419 A1 | 4/2006 | Rosen | |
| 2006/0136419 A1 | 6/2006 | Brydon et al. | |
| 2006/0143067 A1* | 6/2006 | Calabria | 705/10 |
| 2006/0143183 A1 | 6/2006 | Goldberg et al. | |
| 2006/0161599 A1 | 7/2006 | Rosen | |
| 2006/0184617 A1 | 8/2006 | Nicholas et al. | |
| 2006/0190281 A1 | 8/2006 | Kott et al. | |
| 2006/0194186 A1 | 8/2006 | Nanda | |
| 2006/0218225 A1 | 9/2006 | Hee Voon et al. | |
| 2006/0229063 A1 | 10/2006 | Koch | |
| 2006/0230061 A1 | 10/2006 | Sample et al. | |
| 2006/0242139 A1 | 10/2006 | Butterfield et al. | |
| 2006/0242178 A1 | 10/2006 | Butterfield et al. | |
| 2006/0242581 A1* | 10/2006 | Manion et al. | 715/733 |
| 2006/0247940 A1 | 11/2006 | Zhu et al. | |
| 2006/0248573 A1 | 11/2006 | Pannu et al. | |
| 2006/0256008 A1 | 11/2006 | Rosenberg | |
| 2006/0265227 A1 | 11/2006 | Sadamura et al. | |
| 2006/0265277 A1 | 11/2006 | Yasinovsky et al. | |
| 2006/0271569 A1 | 11/2006 | Fong et al. | |
| 2006/0282426 A1* | 12/2006 | Spears | 707/5 |
| 2006/0293976 A1 | 12/2006 | Nam | |
| 2006/0294085 A1 | 12/2006 | Rose et al. | |
| 2007/0050360 A1 | 3/2007 | Hull et al. | |
| 2007/0174389 A1 | 7/2007 | Armstrong et al. | |
| 2007/0208916 A1 | 9/2007 | Tomita | |
| 2007/0226314 A1 | 9/2007 | Eick et al. | |
| 2007/0250511 A1 | 10/2007 | Endler et al. | |
| 2007/0255831 A1 | 11/2007 | Hayashi et al. | |
| 2007/0261071 A1 | 11/2007 | Lunt et al. | |
| 2007/0266097 A1 | 11/2007 | Harik et al. | |
| 2007/0282987 A1 | 12/2007 | Fischer et al. | |
| 2008/0005076 A1 | 1/2008 | Payne et al. | |
| 2008/0010343 A1 | 1/2008 | Escaffi et al. | |
| 2008/0033776 A1 | 2/2008 | Marchese | |
| 2008/0040428 A1 | 2/2008 | Wei et al. | |
| 2008/0040474 A1 | 2/2008 | Zuckerberg et al. | |
| 2008/0070697 A1 | 3/2008 | Robinson et al. | |
| 2008/0086458 A1 | 4/2008 | Robinson et al. | |
| 2009/0171950 A1 | 7/2009 | Lunenfeld | |
| 2010/0057555 A1 | 3/2010 | Butterfield et al. | |
| 2013/0066852 A1* | 3/2013 | Rose | 707/722 |

FOREIGN PATENT DOCUMENTS

| | | |
|---|---|---|
| JP | 2004-139529 | 5/2004 |
| WO | WO 2006/044939 A2 | 4/2006 |

OTHER PUBLICATIONS

Australian Patent Office, Examiner's First Report, Australian Patent Application No. 2007-284811, May 25, 2011, two pages.
Australian Patent Office, Examiner's First Report, Australian Patent Application No. 2007-284813, Jun. 30, 2011, two pages.
Canadian Intellectual Property Office, Office Action, Canadian Patent Application No. 2,660,680, Oct. 16, 2013, four pages.
Canadian Intellectual Property Office, Office Action, Canadian Patent Application No. 2,660,459, Jul. 27, 2012, six pages.
Canadian Intellectual Property Office, Office Action, Canadian Patent Application No. 2,660,680, Jan. 26, 2012, three pages.
ChipIn, "How ChipIn Works: An Overview," Dec. 15, 2006. [Online] [Retrieved Jun. 20, 2008] Retrieved from the Internet <URL:http://web.archive.org/web/20061215090739/www.chipin.com/overview.>.
European Patent Office, European Search Report and Opinion, European Patent Application No. 07836589.7, Dec. 23, 2009, four pages.
European Patent Office, Examination Report, European Patent Application No. 07836589.7, Aug. 30, 2013, four pages.
European Patent Office, Examination Report, European Patent Application No. 07836589.7, Mar. 26, 2010, one page.
Flores, F. et al., "Computer Systems and the Design of Organizational Interaction," *ACM Transactions on Information Systems*, Apr. 1988, pp. 153-172. vol. 6, No. 2.
India Patent Office, First Examination Report, Dec. 19, 2013, Indian Application No. 830/CHENP/2009, two pages.
Japanese Patent Office, Office Action, Japanese Patent Application No. P2009-523824, Apr. 24, 2012, six pages.
Japanese Patent Office, Office Action, Japanese Patent Application No. P2009-523825, May 22, 2012, five pages.
Parzek, E. "Social Networking to ChipIn to a Good Cause," Business Design Studio, Jun. 29, 2006. [Online] [Retrieved Jun. 20, 2008] Retrieved from the Internet <URL:http://www.businessdesignstudio.com/resources/blogger/2006.06social-networking-tochipin-to-good.html.>.
PCT International Search Report and Written Opinion, PCT Application No. PCT/US2007/017572, Jun. 20, 2008, eight pages.
State Intellectual Property Office of the People's Republic of China, Office Action, Chinese Patent Application No. 200780034021.3, Mar. 29, 2012, nine pages.
State Intellectual Property Office of the People's Republic of China, First Office Action, Chinese Patent Application No. 200780034021.3, Feb. 12, 2010, seven pages.
State Intellectual Property Office of the People's Republic of China, Second Office Action, Chinese Patent Application No. 200780034021.3, Oct. 28, 2011, seven pages.
Takai, K., et. al., "ACS: A Social Networking System for Various Human Relationships," Multimedia, Disintegration and Collaboration and Mobile (DICOMO) Symposium Collected Papers, Ver. 1.1, Information Processing Society of Japan, Jul. 2006, vol. 2006, pp. 577-580.

(56) References Cited

OTHER PUBLICATIONS

Tsuruoka, N., et al., "Web 2.0 Practice Technique: Google, Yahoo!, Rest," Web +DB Press, Issued by Kabushikikaisha Gijutsuhyouronsha, vol. 32, Fist Edition, Japan, May 25, 2006, pp. 84-90.

United States District Court, Northern District of California, San Jose Division, Case No. CV12-01212-JSW, Complaint for Patent Infringement, filed by Plaintiff Yahoo! Inc. on Mar. 12, 2012, two hundred forty pages.

United States District Court, Northern District of California, San Francisco Division, Case No. CV12-01212-JSW, Defendant Facebook, Inc.'s Answer; Counterclaim Against Yahoo! Inc. for Patent Infringement, filed by Defendant Facebook, Inc. on Apr. 3, 2012, 344 pages.

United States District Court, Northern District of California, San Francisco Division, Case No. CV12-01212-JSW, Plaintiff Yahoo! Inc.'s Reply and Counter Counterclaims to Defendant Facebook, Inc.'s Answer; Counterclaim Against Facebook, Inc. for Declaratory Judgment of Non-Infringement, Filed by Plaintiff Yahoo! Inc. on Apr. 27, 2012, 81 pages.

United States District Court, Northern District of California, San Francisco Division, Case No. CV12-01212-JSW, Stipulated Motion for Dismissal of Claims and Counterclaims by Yahoo! Inc. and Facebook, Inc., and Order, Agreed to and Filed by Mark Weinstein, Kevin Smith, and the Honorable Jeffrey S. White, Jul. 9-10, 2012, 4 pages.

\* cited by examiner facebook                                    home   search   browse   mobile   invite   help   logout Welcome Matt!

✉ You have 2 new messages.
👤 You have 7 friend requests.

My Status                                                      edit
Matt is zuru zuru zuru zuru.
Updated last Wednesday

Dana joined the group Who is Myke Jones?
Dana Constantinov recently joined the group Who is Myke Jones?. This is for everbody who wants to know who is Myke Jones?. There are currently 120 people, including 16 of your friends, in this group.

402

Anthony joined the group Pugs? Yes, please!
Anthony Davis recently joined the group Pugs? Yes, please! Sure, it looks like a pig who ran head-first into the side of a barn. But ... see more. There are currently 250 people, including 16 of your friends, in this group.

404

Chris is attending G.I. Hoes Bladder Bust Wednesday
Chris Ricci is planning to attend G.I. Hoes Bladder Bust Wednesday. So far another 114 people are going as well.

Brittany is attending Steven Helmkamp
Brittany Gray is planning to attend Steven Helmkamp. So far another 30 people are going as well.

Chris is attending Abigail Occiano
Chris Ricci is planning to attend Abigail Occiano. So far another 28 people are going as well.

Starlyn and Tommy are in a relationship
Starlyn Walker and Tommy Babcock are now officially in a relationship See All Recent Stories Upcoming Events                                 see all
Putnam Appreciation B(day)
Today, July 12 at 3:20pm Birthdays                                       see all
Today's Birthdays
Dr Chris Putnam July 14th Birthdays
Christina Holsberry
Randy Sackfield
Trevor Harkema
Austin Shoemaker The Next Step                                   see all
Post your photos onFacebook Photos. Enjoy unlimited uploads!

🔍 Search
My Profile    edit
My Friends
My Photos
My Groups
My Events
My Messages (2)
My Account
My Privacy

GENERATING A CONSOLIDATED SOCIAL STORY IN A FEED OF STORIES FOR A USER OF A SOCIAL NETWORKING SYSTEM

CROSS REFERENCE TO RELATED APPLICATIONS

This application is a continuation of U.S. application Ser. No. 12/902,024, filed Oct. 11, 2010, which is a continuation of U.S. application Ser. No. 11/502,757, filed Aug. 11, 2006, each of which is incorporated by reference in its entirety.

BACKGROUND

The present invention relates generally to social networking, and more particularly to systems and methods for generating dynamic relationship-based content personalized for members of a web-based social network.

As social networking has grown more popular, the information available to each member has become voluminous. Accordingly, members may be inundated with information that does not interest the members. Further, members may find themselves unable to find in a timely and efficient manner the information that does interest them, such as information about their friends and their community. There is therefore a need for systems and methods for generating dynamic relationship-based content personalized for members of a web-based social network.

SUMMARY

Systems and methods for generating dynamic relationship-based content personalized for members of a web-based social network are provided. An exemplary method comprises storing at least one action of one or more members of a web-based social network, accessing relationship data for the one or more members, associating the at least one action with the relationship data to produce consolidated data, identifying one or more elements associated with the consolidated data, and aggregating the consolidated data based on the one or more elements to produce aggregated consolidated data. Further exemplary methods comprise weighting by affinity the aggregated consolidated data to generate dynamic relationship-based content personalized for the members of the web-based social network.

An exemplary system for generating dynamic relationship-based content personalized for members of a web-based social network comprises a database configured for storing at least one action of one or more members of a web-based social network, a database configured with relationship data for the one or more members of the web-based social network, a processing module configured with an association component to associate the at least one action with the relationship data to produce consolidated data, the processing module configured with an identification component to identify one or more elements associated with the consolidated data, and the processing module configured with an aggregation component to aggregate the consolidated data based on the one or more elements to produce aggregated consolidated data. A further exemplary system comprises the processing module configured with an affinity component to weight by affinity the aggregated consolidated data to generate dynamic relationship-based content personalized for the members of the web-based social network.

BRIEF DESCRIPTION OF THE DRAWINGS

FIG. 4 is an exemplary screen shot of items of generated dynamic relationship-based content personalized for a member of a web-based social network.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Systems and methods for generating dynamic relationship-based content personalized for members of a web-based social network are provided. At least one action of one or more members of a web-based social network is associated with relationship data for the one or more members to produce consolidated data. One or more elements associated with the consolidated data are identified and used to aggregate the consolidated data. Further exemplary methods comprise weighting by affinity the aggregated consolidated data to generate dynamic relationship-based content personalized for the members of the web-based social network.

Figure 1:
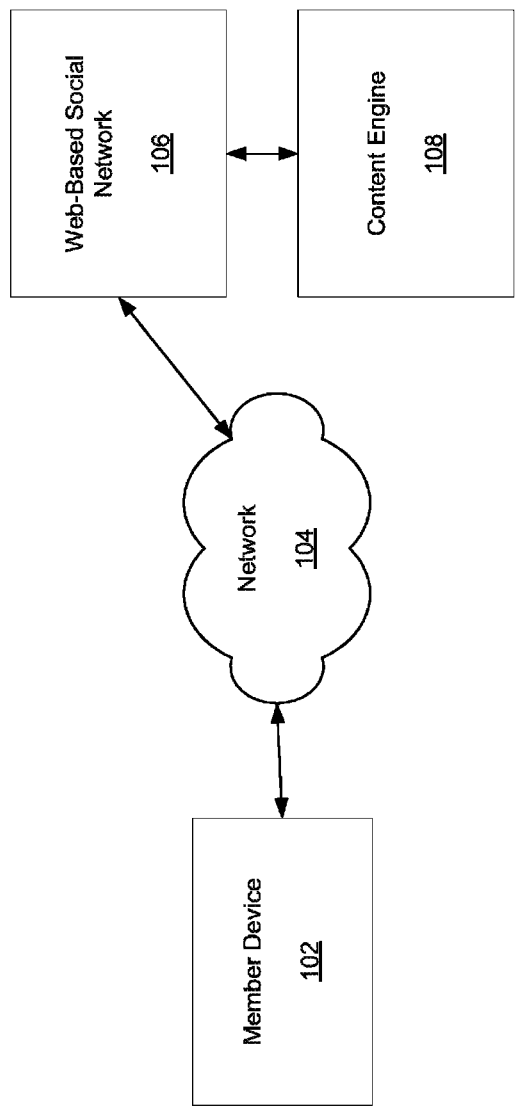
FIG. 1 illustrates an exemplary environment for generating dynamic relationship-based content personalized for members of a web-based social network.

FIG. 1 illustrates an exemplary environment for generating dynamic relationship-based content personalized for members of a web-based social network. One or more members, such as a member at a member device 102, are coupled to a web-based social network 106 via a network 104.

The web-based social network 106 may comprise any entity that provides social networking services, communication services, dating services, and so forth. For example, the web-based social network 106 may host a website that allows one or more members, such as the member at the member device 102, to communicate with one another via the website. In one instance, a first member associated with the member device 102 may communicate with one or more second members associated with one or more second member devices via a social networking website associated with the web-based social network 106. The social networking website offers the member an opportunity to connect or reconnect with the one or more second members that attended, for example, the same university as the member.

According to exemplary embodiments, one or more networks or communities may be provided for each member. For example, the member may have a network comprised of people grouped according to a university attended, a network comprised of people grouped according to the member's geographical location of residence, a network comprised of people grouped according to a common field of work, a network comprised of people grouped according to a particular business, and so forth.

A content engine 108 is coupled to the web-based social network 106. The content engine 108 utilizes action and relationship data about the one or more members, such as the member at the member device 102, to generate dynamic relationship-based content personalized for members of the web-based social network 106. According to some embodiments, the member device 102 may be directly coupled to the content engine 108. According to other embodiments, the content engine 108 comprises a module associated with the web-based social network 106.

Figure 2:
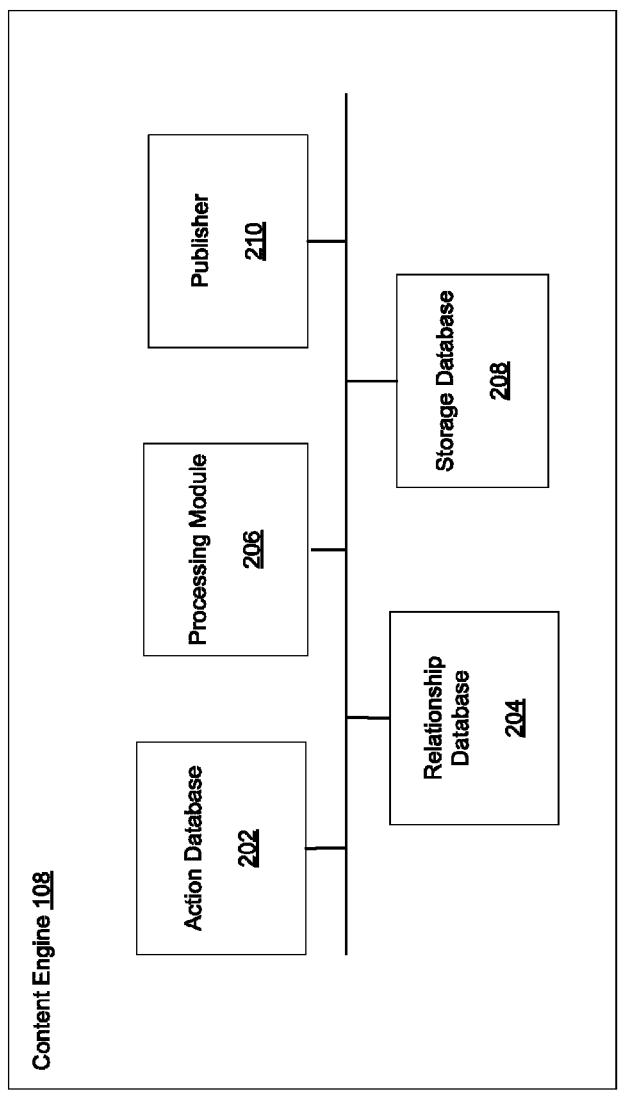
FIG. 2 is a block diagram of an exemplary content engine.

Referring now to FIG. 2, a block diagram of an exemplary content engine is shown. Exemplary content engine 108 comprises an action database 202, relationship database 204, processing module 206, storage database 208, and publisher 210.

An action database 202 may store one or more member actions or activities on the web-based social network 106 (FIG. 1). For example, the action database 202 may store member actions with one or more items of content, such as news stories, other members' profiles, and/or email provided via the web-based social network 106. Any type of member action may be stored in the action database 202.

According to exemplary embodiments, action data may represent a particular member's actions on the web-based social network 106 for a particular period of time, such as the most recent hour, six hours, day, week or month. For example, Member A's action data may represent Member A's actions for the last hour of sending an email to another member, electing to attend a concert with three other members, and adding a photo to Member A's profile.

A relationship database 204 is provided for storing relationship data associated with each of the members, such as the member associated with the member device 102 (FIG. 1). According to exemplary embodiments, relationship database 204 comprises a member profile for each member of the web-based social network 106. When a member joins web-based social network 106, a member profile may be generated for the member. The member can specify relationships with one or more other members via the member profile, or by any other means. The member can assign categories, groups, networks, and so forth to the one or more other members with which the member has a relationship. The relationship, for example, may specify that the member is a friend, friend of a friend, family member, schoolmate, ex-girlfriend, and so forth. Any type of relationship may be specified. Further, the member may group other members according to one or more categories. When the member updates information in the member profile, such as adding additional contacts or friends, the member profile in the relationship database 204 may be updated with the information added.

Figure 3:
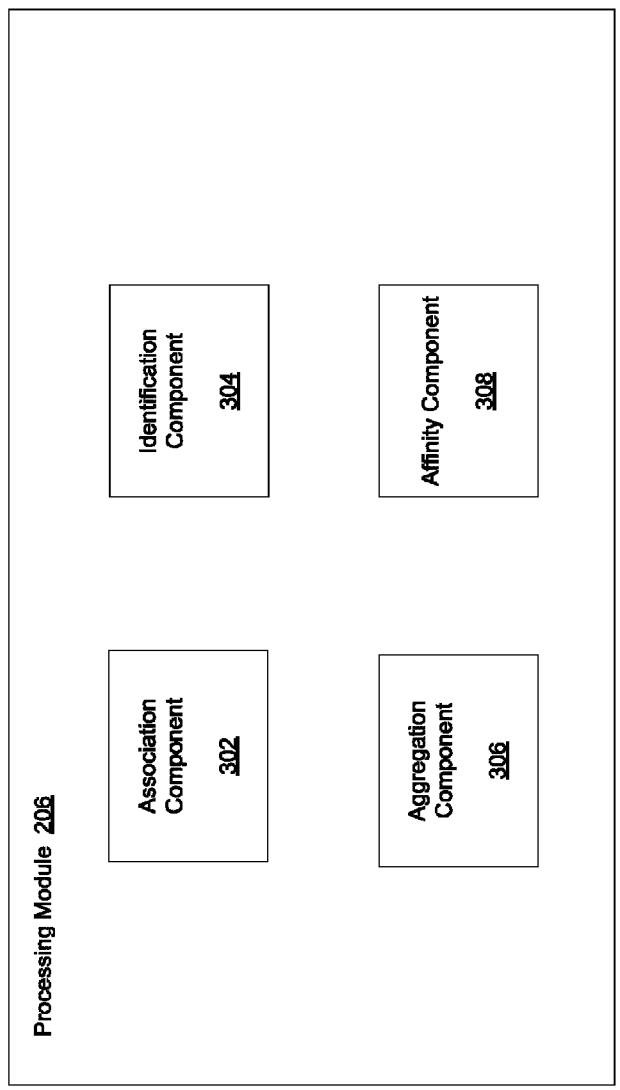
FIG. 3 is a block diagram of an exemplary processing module.

According to some embodiments, processing module 206 is provided for performing several functions as described herein in connection with FIG. 3. Among other things, processing module 206 is responsible for associating member actions with member relationship data to produce consolidated data. Processing module 206 identifies one or more elements associated with the consolidated data and aggregates the consolidated data based on the one or more elements to produce aggregated consolidated data. In a further embodiment, processing module 206 weights by affinity the aggregated consolidated data to generate dynamic relationship-based content personalized for the members of the web-based social network 106. Storage database 208 may be provided for storing the generated dynamic relationship-based content personalized for the members of the web-based social network 106.

Publisher 210 may be provided for publishing the generated dynamic relationship-based content personalized for the members of the web-based social network 106. According to one embodiment, publisher 210 comprises a server configured to send the generated dynamic relationship-based content to a member for whom the content has been personalized. In a further embodiment, publisher 210 is configured to format content in a predetermined arrangement style for presentation to the member of the web-based social network 106.

Although the exemplary content engine 108 is described as being comprised of various components (the action database 202, the relationship database 204, processing module 206, storage database 208, and publisher 210), fewer or more components may comprise the content engine 108 and still fall within the scope of various embodiments.

FIG. 3 is a block diagram of an exemplary processing module. As described in connection with FIG. 2, according to one embodiment, processing module 206 comprises an association component 302, an identification component 304, an aggregation component 306, and an affinity component 308.

Association component 302 is configured to associate one or more member actions with the member's relationship data to produce consolidated data. For example, Member A's profile may include fifteen friends of Member A and another twenty friends of Member A's friends ("friends of friends"). Association component 302 will associate Member A's actions with Member A's friends, friends of friends, and/or other members. For instance, association component 302 might associate Member A's action of joining a group dedicated to the band "Green Day" with Member A's friends who also belong to the same group. In this example, the produced consolidated data might be in the form of "Member A joins Green Day Group, which also includes Member A's friends Pete and Bill."

An identification component 304 may be provided as part of processing module 206 to identify one or more elements associated with the consolidated data. For example, with respect to consolidated data in the form of "Member A joins Green Day Group, which also includes Member A's friends Pete and Bill," identification component 304 might identify the elements of "Green Day." According to some embodiments, identification component 304 may identify any element of an action associated with relationship data (to form consolidated data). For example, identification component 304 may identify an element based on action type, members involved, media or content type, and/or multiple elements thereof. The identified elements are used to aggregate consolidated data, as described herein.

According to some embodiments, aggregation component 306 is provided to aggregate the consolidated data based on the one or more elements to produce aggregated consolidated data. For example, aggregation component 306 might utilize the elements of "Green Day" to aggregate the consolidated data of "Member A joins Green Day Group, which also includes Member A's friends Pete and Bill," with other consolidated data sharing the same elements of "Green Day." In this example, aggregation by aggregation component 306 might result in aggregated consolidated data in the form of "Member A and fifty other members of Member A's community join the Green Day Group." Aggregation component 306 may utilize other parameters or criteria for aggregation and remain within the scope of embodiments claimed herein.

According to some embodiments, affinity component 308 is provided to weight by affinity the aggregated consolidated data to generate dynamic relationship-based content personalized for members of web-based social network 106. Based on one or more member activities and associated relationships, an affinity for past, present, or future content may be determined by the affinity component 308. Any type of variable may be considered when determining an affinity for the affinity component 308 to weight the aggregated consolidated data. In a further embodiment, affinity component 308 may be utilized to assign an order to the content presented to the member. For example, a story about Member B breaking up with Member C may be rated lower than a story about Member A's brother having a baby, and accordingly, the story about Member B breaking up with Member C may appear below the story about Member A's brother having a baby.

FIG. 4 is an exemplary screen shot of items of generated dynamic relationship-based content personalized for a member of a web-based social network. The exemplary screen shot 400 represents the display page associated with a particular member, such as the member at member device 102. Various stories, content, and so forth may be displayed via the display page. In the exemplary screen shot shown in FIG. 4, several stories and/or story headlines are displayed.

A first story 402, entitled "Dana joined the group Who is Myke Jones?" is rated highest according to affinity. An affinity may have been assigned to each story appearing on the display page, based on the member's interaction with other content and the member's relationships associated with the member's interaction with the other content. The stories are then displayed in an order according to the affinity. For example, the first story 402 is assigned the highest order based on the affinity determined for the member for content and/or other members included in the first story 402, while a second story 404, entitled "Anthony joined the group Pugs? Yes, please!", is assigned the second highest order based on the affinity determined for the member with respect to the content and/or the other members included in the second story 404, and so forth.

Although the affinity is determined based on the one or more member activities within the web-based social network 106, according to some embodiments, member activity outside of the web-based social network 106 may also be considered in determining affinity for content and/or other members.

Figure 5:
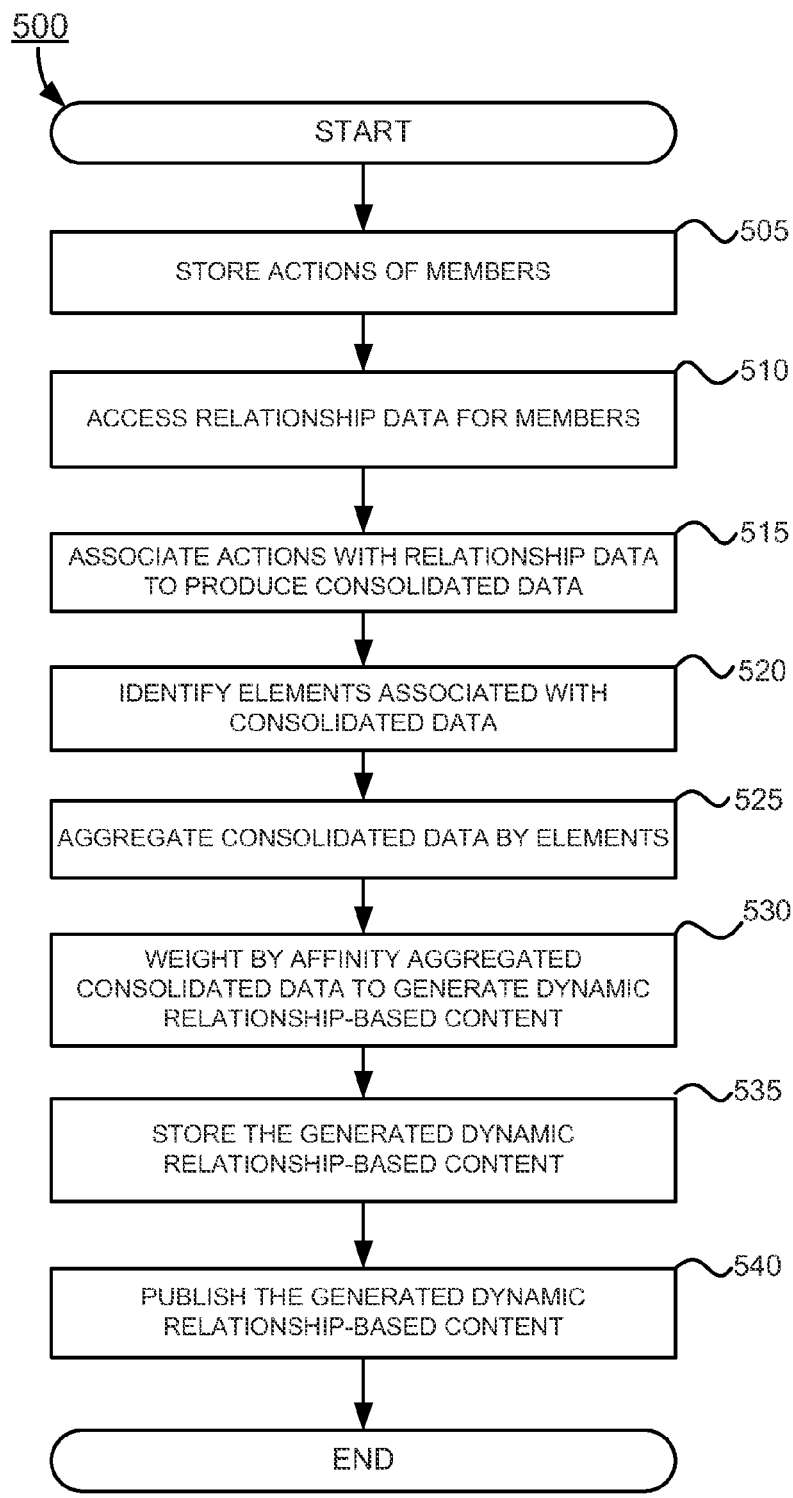
FIG. 5 is a flow diagram of an exemplary process for generating dynamic relationship-based content personalized for members of a web-based social network.

Referring now to FIG. 5, a flow diagram of an exemplary process for generating dynamic relationship-based content personalized for members of a web-based social network is shown.

At step 505, at least one action of one or more members of web-based social network 106 (FIG. 1) is stored. According to one embodiment, member action data may represent a particular member's actions on the web-based social network 106 for a particular period of time.

At step 510, relationship data for the one or more members of the web-based social network 106 is accessed. In one embodiment, a relationship database 204 (FIG. 2) stores data configured in member profiles, including friends and/or friends of friends of members.

At step 515, at least one action (step 505) is associated with the relationship data (step 510) to produce consolidated data. In one embodiment, association component 302 associates a member's actions with the member's friends and/or the member's friends of friends that might have also been involved with the same actions.

At step 520, one or more elements associated with the consolidated data are identified. In one embodiment, an identification component 304 identifies one or more symbols, sounds and/or images associated with consolidated data.

At step 525, the consolidated data is aggregated based on the one or more elements to produce aggregated consolidated data.

At step 530, the aggregated consolidated data is weighted by an affinity to generate dynamic relationship-based content personalized for the members of the web-based social network 106. According to some embodiments, the content may be generated and/or ordered according to a prediction of future member activities.

At step 535, the generated dynamic relationship-based content personalized for the members of the web-based social network 106 is stored.

At step 540, the stored generated dynamic relationship-based content is published for the members of the web-based social network 106. In one embodiment, a server is configured to send the content to a member for whom the content has been personalized.

While various embodiments have been described above, it should be understood that they have been presented by way of example only, and not limitation. For example, any of the elements associated with the content engine may employ any of the desired functionality set forth hereinabove. Thus, the breadth and scope of a preferred embodiment should not be limited by any of the above-described exemplary embodiments.

What is claimed is:

1. A method comprising:
receiving information about actions performed by a plurality of users of a social networking system;
accessing relationship data for the plurality of users, the relationship data identifying relationships in the social networking system among users of the plurality of users;
receiving a request from a viewing user of the plurality of users for a feed of stories;
selecting a plurality of the stored actions, wherein each of the selected stored actions relate to another user of the plurality of users with whom the viewing user has a relationship in the social networking system as identified in the relationship data, and wherein the selected stored actions have a common element;
generating an aggregated story for the viewing user, wherein the aggregated story comprises a description of the common element, the selected stored actions, and the users related to the selected stored actions;
generating the requested feed of stories for the viewing user, the generated feed of stories comprising:
the generated aggregated story, and
one or more other stories that describe one or more other stored actions that relate to one or more other users of the plurality of users with whom the viewing user has a relationship in the social networking system; and
sending the feed of stories for display to the viewing user.

2. The method of claim 1, wherein the common element comprises an object in the social networking system on which a selected action was performed.

3. The method of claim 1, wherein the common element comprises a type of action of a selected action.

4. The method of claim 1, wherein the aggregated story describes the one or more other users who performed the additional actions by providing a total number of the one or more other users who performed the additional actions.

5. The method of claim 1, wherein the aggregated story comprises an image.

6. The method of claim 1, wherein the aggregated story comprises a selectable link.

7. The method of claim 1, wherein the plurality of the stored actions are selected based on the viewing user's affinity for one or more of the selected actions.

8. The method of claim 1, wherein the plurality of the stored actions are selected based on the viewing user's affinity for one or more users who performed one or more of the selected actions.

9. The method of claim 1, wherein a selected action is selected from a group consisting of: a change of a user profile, joining a group, attending an event, declaring a relationship with another user, and any combination thereof.

10. A computer program product comprising a non-transitory computer-readable storage medium including computer program code for:
    receiving information about actions performed by a plurality of users of a social networking system;
    accessing relationship data for the plurality of users, the relationship data identifying relationships in the social networking system among users of the plurality of users;
    receiving a request from a viewing user of the plurality of users for a feed of stories;
    selecting a plurality of the stored actions, wherein each of the selected stored actions relate to another user of the plurality of users with whom the viewing user has a relationship in the social networking system as identified in the relationship data, and wherein the selected stored actions have a common element;
    generating an aggregated story for the viewing user, wherein the aggregated story comprises a description of the common element, the selected stored actions, and the users related to the selected stored actions;
    generating the requested feed of stories for the viewing user, the generated feed of stories comprising:
        the generated aggregated story, and
        one or more other stories that describe one or more other stored actions that relate to one or more other users of the plurality of users with whom the viewing user has a relationship in the social networking system; and
    sending the feed of stories for display to the viewing user.

11. The computer program product of claim 10, wherein the common element comprises an object in the social networking system on which a selected action was performed.

12. The computer program product of claim 10, wherein the common element comprises a type of action of a selected action.

13. The computer program product of claim 10, wherein the aggregated story describes the one or more other users who performed the additional actions by providing a total number of the one or more other users who performed the additional actions.

14. The computer program product of claim 10, wherein the aggregated story comprises an image.

15. The computer program product of claim 10, wherein the aggregated story comprises a selectable link.

16. The computer program product of claim 10, wherein a selected action is selected from a group consisting of: a change of a user profile, joining a group, attending an event, declaring a relationship with another user, and any combination thereof.

17. A system comprising:
a processor;
a computer-readable storage medium coupled to the processor, the computer-readable storage medium including instructions for:
    receiving information about actions performed by a plurality of users of a social networking system;
    accessing relationship data for the plurality of users, the relationship data identifying relationships in the social networking system among users of the plurality of users;
    receiving a request from a viewing user of the plurality of users for a feed of stories;
    selecting a plurality of the stored actions, wherein each of the selected stored actions relate to another user of the plurality of users with whom the viewing user has a relationship in the social networking system as identified in the relationship data, and wherein the selected stored actions have a common element;
    generating an aggregated story for the viewing user, wherein the aggregated story comprises a description of the common element, the selected stored actions, and the users related to the selected stored actions;
    generating the requested feed of stories for the viewing user, the generated feed of stories comprising:
    the generated aggregated story, and
    one or more other stories that describe one or more other stored actions that relate to one or more other users of the plurality of users with whom the viewing user has a relationship in the social networking system; and
    sending the feed of stories for display to the viewing user.

18. The system of claim 17, wherein a selected action is selected from a group consisting of: a change of a user profile, joining a group, attending an event, declaring a relationship with another user, and any combination thereof.

19. The system of claim 17, wherein the aggregated story describes the one or more other users who performed the additional actions by providing a total number of the one or more other users who performed the additional actions.

20. The system of claim 17, wherein the common element is selected form a group consisting of: an object in the social networking system on which a selected action was performed, a type of action of the selected action, and any combination thereof.

* * * * *